United States Patent [19]
Sokolov et al.

[11] Patent Number: 6,018,789
[45] Date of Patent: Jan. 25, 2000

[54] DISK DRIVE WITH CACHE SEGMENT PROVIDING ADAPTIVELY MANAGED CHUNKS

[75] Inventors: Daniel John Sokolov; Jeffrey L. Williams, both of Rochester, Minn.

[73] Assignee: Western Digital Corporation, Irvine, Calif.

[21] Appl. No.: 08/976,895

[22] Filed: Nov. 24, 1997

[51] Int. Cl.[7] .................................................. G06F 12/08
[52] U.S. Cl. ............................ 711/113; 711/129; 711/173
[58] Field of Search ..................... 707/205; 711/113–114, 711/118, 129, 133–135, 144–145, 159, 171, 173, 208–209, 4

[56] References Cited

U.S. PATENT DOCUMENTS

| | | | |
|---|---|---|---|
| 4,941,059 | 7/1990 | Grnat | 360/72.2 |
| 5,159,678 | 10/1992 | Wengelski et al. | 395/425 |
| 5,247,634 | 9/1993 | Cline et al. | 395/425 |
| 5,481,519 | 1/1996 | Hosoya | 369/58 |
| 5,481,702 | 1/1996 | Takahashi | 395/600 |
| 5,506,983 | 4/1996 | Atkinson et al. | 395/600 |
| 5,561,786 | 10/1996 | Morse | 711/170 |
| 5,845,296 | 12/1998 | Jasuja | 707/205 |
| 5,890,213 | 3/1999 | Sokolov | 711/113 |
| 5,915,260 | 6/1999 | Sokolov | 711/113 |
| 5,937,426 | 8/1999 | Sokolov | 711/113 |

*Primary Examiner*—John W. Cabeca
*Assistant Examiner*—Denise Tran
*Attorney, Agent, or Firm*—Leo J. Young; Milad G. Shara

[57] ABSTRACT

The disk drive provides a method of adaptively managing a cache segment divided into chunks by defining an unavailable data type to be stored in an element of a chunk array which indicates that the chunk is not available, and defining an available data type to be stored in an element of the chunk array that indicates the chunk is available and that indicates the number of consecutive chunks that are available. The disk drive also computes a number of chunks needed to fit the request length and scans the chunk array to find a first available element whose available data type meets a predetermined criteria for the number of chunks needed to fit the request length.

16 Claims, 9 Drawing Sheets

_6,018,789_

DISK DRIVE WITH CACHE SEGMENT PROVIDING ADAPTIVELY MANAGED CHUNKS

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The invention relates to a disk drive having a segmented cache with unchunked segments and chunked segments and more particularly to a method of determining when to chunk, and to a method of adaptively managing the chunks in response to data contained in the cache.

BACKGROUND OF THE INVENTION

Disk drives employ a cache, made of semiconductor memory, to increase performance. A host computer sends read and write commands through an interface, such as the Small Computer System Interface (SCSI), to the disk drive. The disk drive stores data to be written on the disk or data read from the disk in the cache. A cache hit occurs when the cache contains data requested in a read command. The disk drive can then provide the requested data from the cache without incurring mechanical delays.

In SCSI, the host computer is known as the initiator and the disk drive is known as the target. The initiator sends a command to the target and the target must determine what appropriate action to take based on the type of command. SCSI commands are communicated by sending a command descriptor block during a command phase. SCSI supports a number of commands including data transfer request commands. Data transfer requests include a read command, a read extended command, a write command, and a write extended command. One of the SCSI commands formats the drive medium into initiator addressable logical blocks. Each logical block has a logical block address (LBA).

The logical block address, LBA, uniquely references the location of data on the disk drive. Data transfer requests include the staring LBA of the data to be read or written and the number of logical blocks to continue to read or write and the length of the read or write. When two commands refer to a contiguous range of LBAs, the disk drive designates one command to be sequential with the other command. For example, a second command having a starting LBA of 1024 with a length of 256 logical blocks would be sequential to a first command with a stating LBA of 512 with a length of 512 logical blocks. When a second command does not refer to a sequential range of LBAs, the disk drive may designate the second command as a non-sequential command. Non-sequential commands include random commands and series of commands whose total block length is relatively small.

The structure of the cache affects disk drive performance. To increase performance, the cache may be divided into smaller units called segments. These segments store data that have boundaries associated with fixed or variable LBA address ranges.

One method of the prior art uses fixed sized segments. When a request arrives, an entire segment of the cache is allocated to the request regardless of its length. The allocation of an entire segment to a non-sequential command wastes the unused portion of the segment. Additionally in these cases, the disk drive must flush the previously stored data from the segment which reduces the probability of cache hits occurring for subsequent requests.

What is needed in the art is a way of making more efficient use of cache segments.

SUMMARY OF THE INVENTION

The invention provides a disk drive having a buffer memory and means for connecting to a host computer, such as a SCSI interface. The buffer memory is logically divided into a plurality of segments. The disk drive has a data structure means for indicating that a segment is chunked and for indicating that a segment is unchunked. A segment that is designated to be chunked is logically divided into N chunks where N is an integer. The disk drive further has a chunk array having N elements where each element is associated with a respective one of the chunks of the segment designated to be chunked. The invention provides a method of allocating portions of the buffer memory in the disk drive. The invention defines an unavailable data type to be stored in an element of the chunk array. The unavailable data type indicates that the chunk is not available. The invention also defines an available data type to be stored in an element of the chunk array. The available data type indicates the chunk is available and indicates the number of consecutive chunks that are available. The disk drive receives a data transfer request with a request length and determines if the request length is less than a predetermined amount. The invention also computes a number of chunks needed to fit the request length; scans the chunk array to find a first available element whose available data type is equal to or greater than the number of chunks needed to fit the request length; and, starting from the first available element, writes the unavailable data type to a consecutive number of chunk array elements needed to fit the request length.

The invention also provides that a plurality of chunks contain data associated with a plurality of sequential logical block addresses, and that the number of chunks needed to satisfy a request equals the rounded integer determined by the number of logical blocks requested times the sum of the number of bytes in a logical block plus the number of bytes for error detection divided by the number of bytes in a chunk.

Further the invention provides that segments are allocated based on a size of the data to be transferred, that the interface conforms to the Small Computer System Interface (SCSI) standard and that the steps are implemented by a microcontroller.

The invention assigns a request to the chunked segment if the amount of data requested is less than a predetermined portion of the chunked segment. In one embodiment, the predetermined portion is less than half the size of the segment. The invention preferably assigns a request to the unchunked segment if there is a cache hit in the unchunked segment.

The invention also provides that the unchunked segment stores data from a sequential stream as indicated by two consecutive logical block groups being referenced in two task control blocks.

The invention alternatively provides the step of scanning the chunk array to find a smallest available element whose available data type is equal to or greater than the number of chunks needed to fit the request length and less than the number of chunks needed to fit the request length plus a predetermined range of chunks. Then an unavailable data type is written to a consecutive number of chunk array elements needed to fit the request length starting from the smallest available element.

The invention alternatively provides the step scanning the chunk array to find a largest available element whose available data type is greater than any other available data type and is greater than the number of chunks needed to fit the request length. Then an unavailable data type is written to a consecutive number of chunk array elements needed to fit the request length starting from the largest available element.

The invention further provides a method of deallocating a chunk. A chunk is deallocated by first setting a current chunk variable to the chunk to be deallocated. Then setting an index variable to the value in the chunk array entry for the next highest chunk from the current chunk. The index variable is then incremented. The invention then stores the index variable in the chunk array entry for the current chunk and sets the current chunk variable to the next lowest chunk. Next the value of the chunk array entry for the current chunk is checked, and if the value is equal to the unavailable data type the deallocation procedure is ended. If the value is not equal to the unavailable data type the invention continues the above process until an available data type value is found in the chunk array.

DETAILED DESCRIPTION OF THE PREFERRED EMBODIMENT

Figure 1:
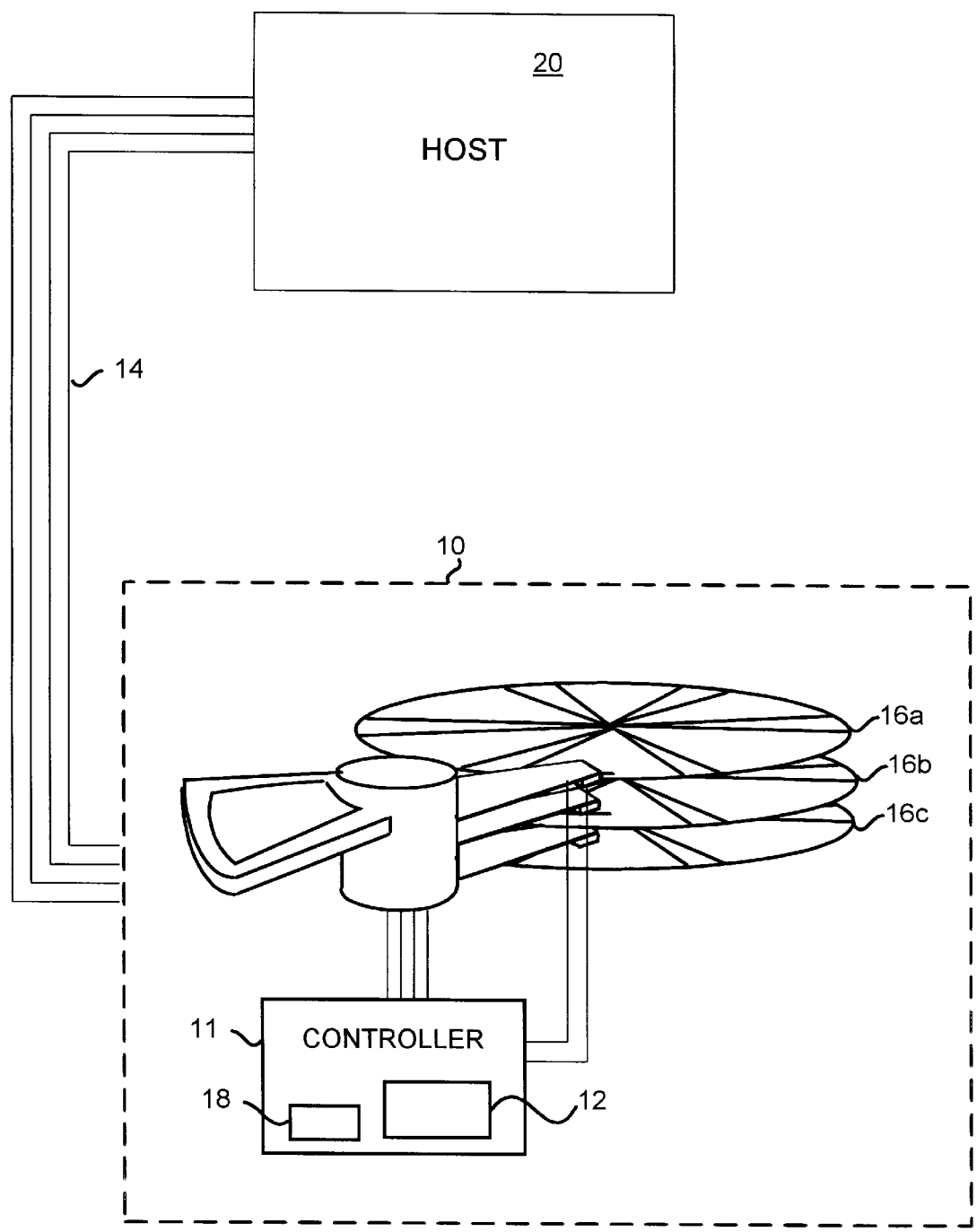
FIG. 1 shows the disk drive of the invention connected to a host computer.

Refer now to FIG. 1 which shows a disk drive 10 with a SCSI interface 14 connected to a host 20. The disk drive 10 has multiple storage disks 16a–c, a controller 11 including a microprocessor 18 and a cache 12 made of semiconductor memory. For example, the cache could be 512K or 1MEG of DRAM. In one embodiment of the invention the microprocessor 18 is a microcontroller such as the 8XC196. The host 20, a computer such as a personal computer, server or workstation, sends commands to the disk drive 10 following the SCSI standard. The microprocessor 18 executes firmware instructions that carry out the host 20 commands. In the disk drive of the invention the microprocessor 18 adaptively manages the cache 12 to increase the performance of the disk drive during random commands, decides when to adaptively allocate a data transfer request to a chunk or chunks of the cache 12 and adaptively deallocates chunks of the cache 12.

Figure 2:
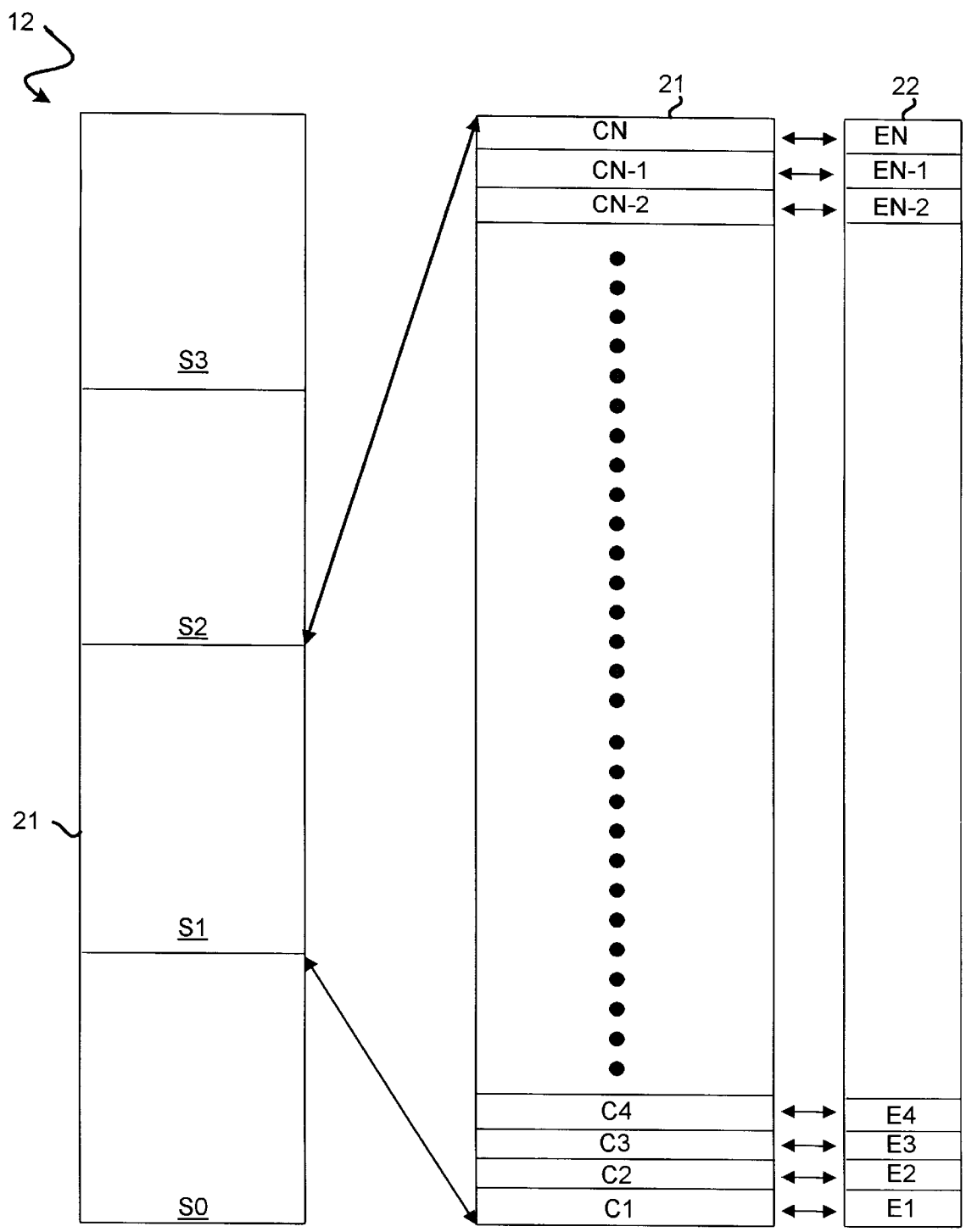
FIG. 2 shows a schematic diagram of a segmented cache where one segment has been chunked.

Refer now to FIG. 2 which shows the structure of one example embodiment of the cache of the invention with a chunk array. Cache 12 is divided into four segments S0, S1, S2 and S3. Segment S1 21, a "chunked" segment, has been further logically divided into a number of chunks, C1 through CN. Chunk array 22 contains a chunk array element, E1 through EN, for each one of the chunks, C1 through CN. Chunk array element E1 refers to chunk C1, chunk array element E2 refers to chunk C2, etc. Segment S1 21 contains data requested in a data transfer request. Elements E1 through EN contain chunk array data types that are used to both allocate chunks in the segment S1 21 and deallocate chunks in the segment S1 21 for the storage of data. The other segments S0, S2, S3 are "unchunked" segments, that is they have not been subdivided into chunks.

Generally, data that is sequential in nature will be stored in unchunked segments S0, S2 and S3. Data that is not sequential, for example small amounts of data and random type data, will be stored in the chunked segment S1 21. The invention tries to keep small sized data in the cache to avoid searching the disk for small pieces of data. The invention also tries to enable more efficient command management.

The invention provides for a wide variety of segment and chunk sizes. The size of a cache, the size of a segment and the size of a chunk may be chosen based on the anticipated use of the disk drive. In one example, a cache memory may be divided into 4 segments of 256 kilobytes in length. A chunked segment may be logically divided into 64 chunks of 4 kilobytes each. The size of a chunk is set at the startup of the system.

The invention provides basic cache management functions for the allocation and deallocation of chunks. The cache management functions include: chunking of a segment, unchunking of a segment, allocation of a chunk or chunks within a segment, and deallocation of a chunk or chunks within a segment. Generally, allocation refers to the storage of data from a single request, or multiple coalesced requests, and deallocation refers to freeing the allocated memory for future use by another request.

Multiple data transfer requests may be coalesced by the disk drive into a single data transfer request. The data from this single data transfer request may then be stored in a chunked or unchunked segment.

Figure 3:
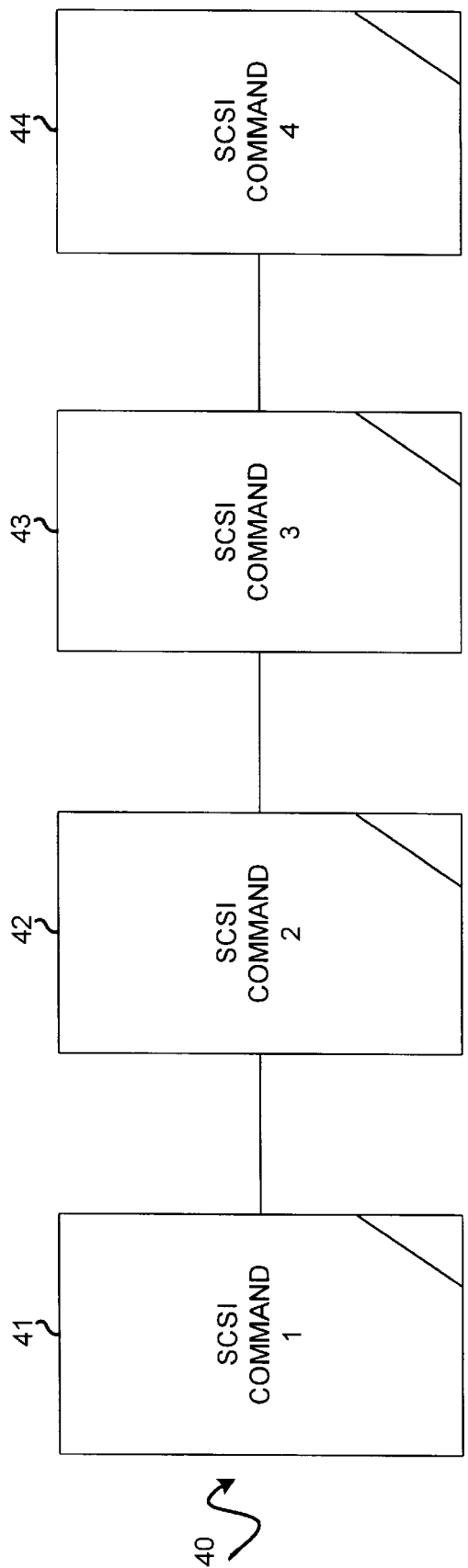
FIG. 3 shows a command queue of four SCSI commands.

Before considering each function in detail refer also to FIG. 3 which shows a command queue 40 with a plurality of commands 41, 42, 43 and 44 received from host 20. Each command has a task control block which identifies commands and provides information about the command including whether the command is a read or write command, the starting LBA and logical block length, and other command related information A queue tag type, received in a queue tag message, can restrict the execution order of commands. The starting LBA refers to the first data location for the command on the disk. The logical block length refers to how many logical blocks are requested staring from the starting LBA. The method of the invention manages the storage and retrieval of data associated with the commands in the queue 40.

The cache 12 and cache control architecture is structured to efficiently handle the commands in the queue 40.

The segments S0, S1, S2 and S3 may have fixed or variable length. Each unchunked segment may store data from contiguous LBAs. The LBAs may also wrap on segment boundaries and may employ hardware address wrapping.

The invention provides a cache control architecture that maintains a cache entry data structure for each unchunked segment One example of such a cache entry data structure is the following C/C++ programming language structure definition The structure defines an element of a linked list of cache entries. An array of cache entries may also be used.

Listing 1—CacheEntry Data Structure (© 1996 Western Digital Corp.)

```
struct CacheEntry{
    LWORD   Lba;        /* first valid logical block address         */
    LWORD   offset;     /* segment offset pointer (in blocks) to     */
                        /* the start of valid data                   */
    LWORD   pfLba;      /* pf lba, first lba in prefetch             */
    LWORD   endPfLba;   /* Lba after end of pf data, one more than   */
                        /* lba + blockCount after pf completes       */
    LWORD   blockCount; /* block count for this segment              */
    LWORD   hitCount;   /* hit count for cache hits                  */
    BYTE    state;      /* state flags                               */
    BYTE    accType;    /* access type indicator                     */
    BYTE    scanCount;  /* number of times scan has missed           */
    BYTE    nextPri;/* next item in priority list                    */
}
```

The Lba variable contains the LBA of the first valid data entry in this cache segment. The data is stored in the cache segment at the relative address contained in the offset variable. The offset address is relative to the start of the segment. If the offset is greater than the size of the segment, the data will wrap to the beginning of the segment.

In some instances the disk drive will prefetch data after a read command is executed. During a prefetch, data is read from the next contiguous LBA The value of the next contiguous LBA is stored in the variable pfLba. The end LBA of the prefetch is stored in the variable endPfLba. The total number of blocks read, including the prefetch, is stored in the blockCount variable.

The nextPri variable contains a pointer to the next unchunked segment in the linked list of cache entries. The nextPri pointer variable provides a method to prioritize the segments. In addition to the chunk array, each chunked segment has a chunk descriptor structure similar to the cache entry structure. The chunk descriptor structure is shown in listing 2.

Listing 2—ChunkDescriptor Data Structure (© 1996 Western Digital Corp.)

```
struct ChunkDescriptor{
    LWORD   Lba;         /* first valid logical block address   */
    LWORD   blockCount;  /* block count for this chunk          */
    LWORD   hitCount;    /* hit count for cache hits            */
    WORD    segment;     /* segment number of the chunk         */
    WORD    chunknumber; /* first chunk allocated               */
    WORD    numberchunks;/* number ofchunks aliocated           */
    BYTE    state;       /* state flags                         */
    BYTE    accType;     /* access type indicator               */
    BYTE    scanCount;   /* number of times scan has missed     */
    BYTE    nextPri;/* next item in priority list               */
}
```

The variables are similar to the cache entry structure variables. Each chunked segment has a list of chunk descriptors.

The chunk array data type stored in the chunk array has the following structure. A value of zero indicates that the chunk is being used. A non zero positive integer indicates the chunk is free to be used. The value of the non zero integer indicates how many consecutive chunks are available for allocation, including this chunk. For example, a value of four indicates that this chunk is free and the next three chunks are free. A value of three indicates that this chunk is free and the next two chunks are free.

In summary, this chunk array data type indicates whether or not a chunk has been allocated. If a chunk has not been allocated, then the chunk array data type indicates the number of contiguous unallocated chunks in the segment starting from this chunk. The chunk array data type offers ease of maintenance during chunk allocation and deallocation, providing a method for quickly determining the size of the remaining portions of the segment of cache memory that are contiguous and unallocated. With this information, an appropriate chunk or chunks of a segment can be efficiently chosen for use with a read or write data transfer request Having described the structure of the cache, an unchunked segment, a chunked segment and a chunk, the basic cache management functions may now be described.

To understand how the invention chunks a segment, refer again to FIG. 2. The cache is initially divided into a number of segments, for example four segments. Each segment is initially designated as unchunked. For example, each of the unchunked segments S0, S1, S2 and S3 have a corresponding cache entry data structure that was allocated and defined when the segment was created. The unchunked segments are then prioritized by the linked priority list of segments created by the nextPri pointer. In one embodiment of the invention, the priority is based on the age of data in the segment. Then each respective data element of the cache entry structure is initialized for each segment.

When the invention chunks a segment, the segment's cache entry is removed from the priority list. The segment is now considered a chunked segment and a chunk array and a chunk descriptor array is created for the segment.

When the invention unchunks a segment the segment's cache entry is placed in the linked priority list and is now available for use as an unchunked segment.

The invention adaptively determines when to chunk a segment and whether to store the data from a request in a chunked or unchunked segment. The adaptation is based on a number of factors including the size of the data to be transferred, the LBAs of the data to be transferred, the LBAs of data already in the cache, and the age of the data in the cache. Generally if a data for a request is to be stored in a chunked segment because the request met one of the criteria described below, if no segment has yet been chunked, then the invention will chunk one of the unchunked segments.

The invention will unchunk a segment if the segment is needed to satisfy a sequential request or a large request.

The decision to store request data in a chunked or unchunked segment may be based on the size of the data to be transferred. For example, a request is assigned to a chunked segment if the amount of data requested is less than or equal to half the size of the full segment The decision to store requested data in a chunked or unchunked segment may be based on the cache access of the request. For example, a request is assigned to the unchunked segment if there is a cache hit in one of the other unchunked segments.

Figure 4:
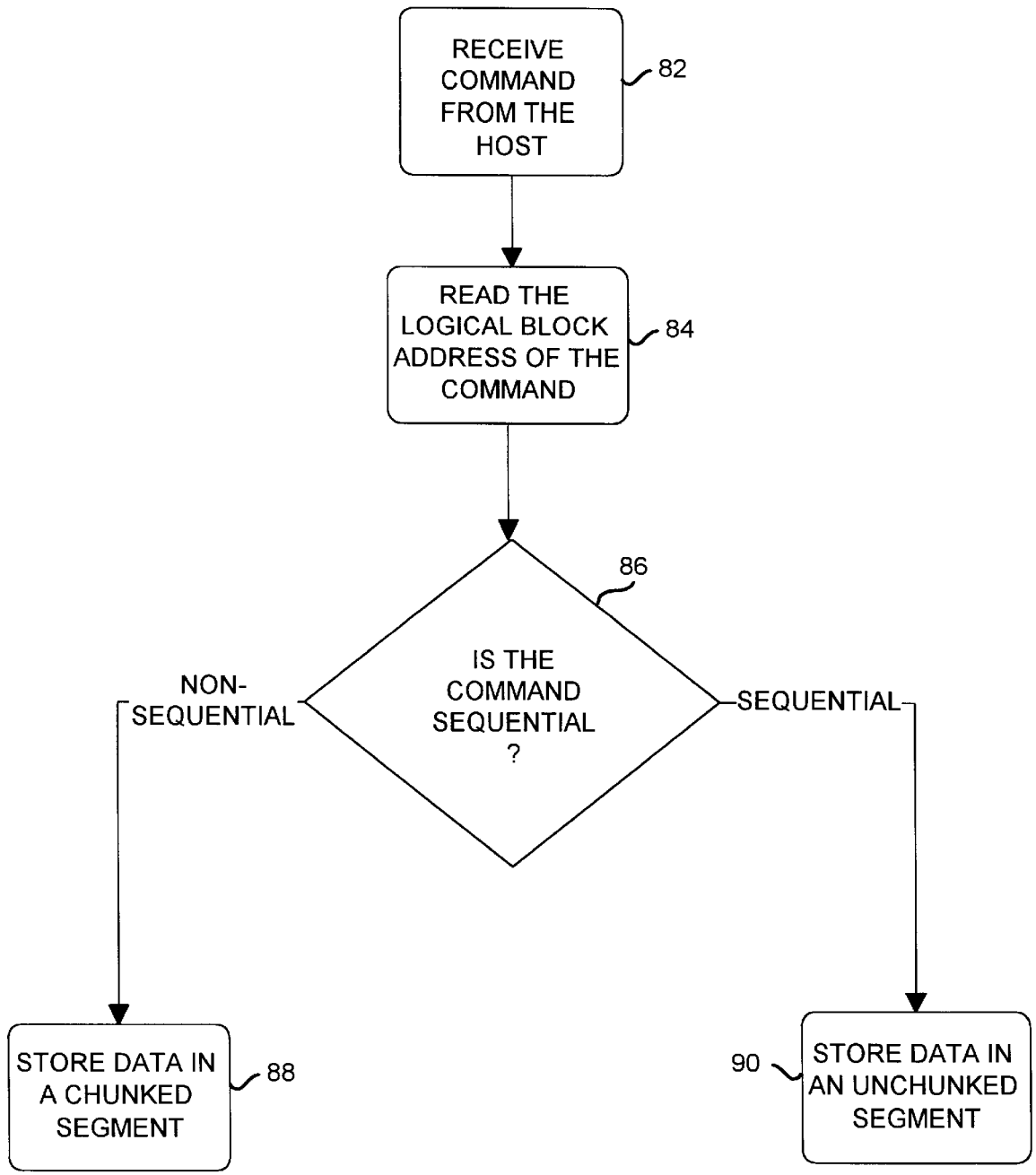
FIG. 4 shows the method of the invention to determine whether data should be stored in a chunked or unchunked segment.

Refer now to FIG. 4 which shows one method of the invention to determine a sequential cache access and make the chunking decision. The disk drive 10 first receives a command from the host in step 82. The disk drive 10 then reads the logical block address of the command in step 84. The disk drive then determines, based on the logical block address of the write request, whether the command is a random command or a sequential command in step 86.

A request is sequential if there exists in the cache a segment that contains a LBA that is contiguous with the starting LBA of the command. The command is considered to be random otherwise. If the command is random the disk drive 10 stores the data in the chunked segment in step 88. If the command is sequential the disk drive 10 stores the data to the unchunked segment in step 90.

The invention provides three methods of allocating chunks for a request. The first method is known as the first fit method of chunk allocation and is described in FIG. 5. The second method is the best or range fit method and is described in FIG. 6. The third method is the worst fit method and is described in FIG. 7.

A data transfer request contains the starting LBA and the request length. To determine the number of chunks to allocate, the invention divides the request length by the size of a chunk. This result is then rounded up to the next integer number of chunks.

In one embodiment of the invention, the number of chunks needed to satisfy a data request also takes into account the memory space needed to store error detection bytes. The number of chunks needed to satisfy the request equals a rounded integer determined by the number of logical block addresses requested times the sum of the number of bytes in a logical block plus the number of bytes for error detection divided by the number of bytes in a chunk.

Figure 5:
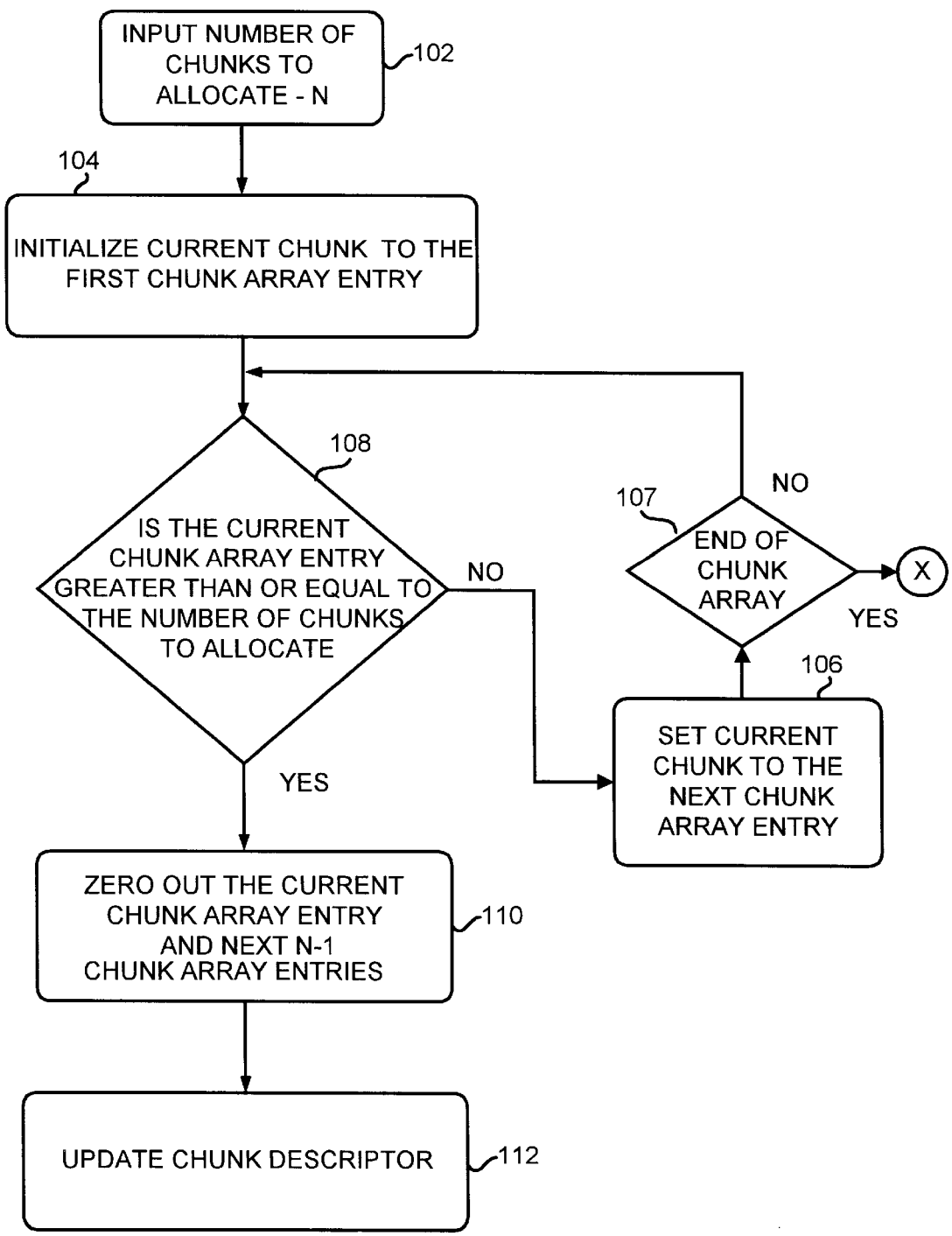
FIG. 5 shows the method of the invention to allocate chunks in a segment using a first fit method.

Refer now to FIG. 5 which shows the method of the invention to allocate chunks in a chunked segment using the first fit method. The method first inputs the number of chunks to allocate, N, in step 102. A current chunk variable is set to the first chunk array entry in step 104. The process flows to step 108 to check if the current chunk array entry is greater than or equal to the number of chunks to allocate. If the current chunk array entry is less than the number of chunks to allocate, then the process flows to step 106 to set the current chunk to the next chunk in the chunk array. The routine then checks at 107 to see if it has reached the end of the chunk array. If so, the routine exits without finding a chunk array entry to fit the request. If the end of the array has not been reached, the routine continues to scan the chunk array at 108. If the current chunk array entry is greater than or equal to the number of chunks to allocate, then the process flows to step 110 to zero out the current chunk array entry and the next number of chunks minus 1 (N−1) chunk array entries.

By zeroing out the chunk array entries the invention provides a preferred method to efficiently indicate that the corresponding chunks have been allocated. Those skilled in the art will appreciate that other values which fall outside the set of values used to describe a number of chunks may also be used without departing from the scope of the invention. The process then flows to step 112 to update the chunk descriptor for the chunks allocated.

Figure 6:
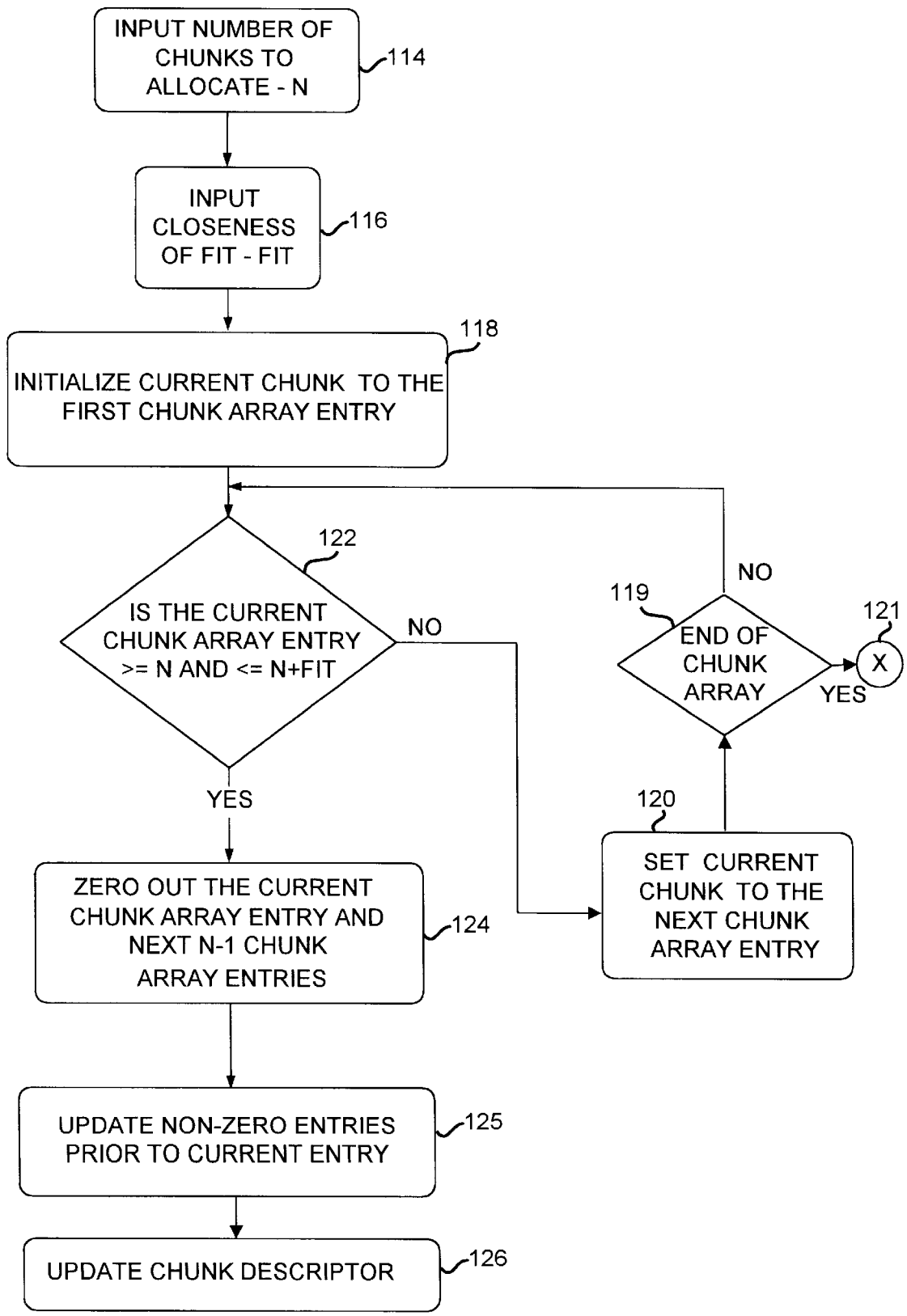
FIG. 6 shows the method of the invention to allocate chunks in a segment using a best/range fit method.
Figure 7:
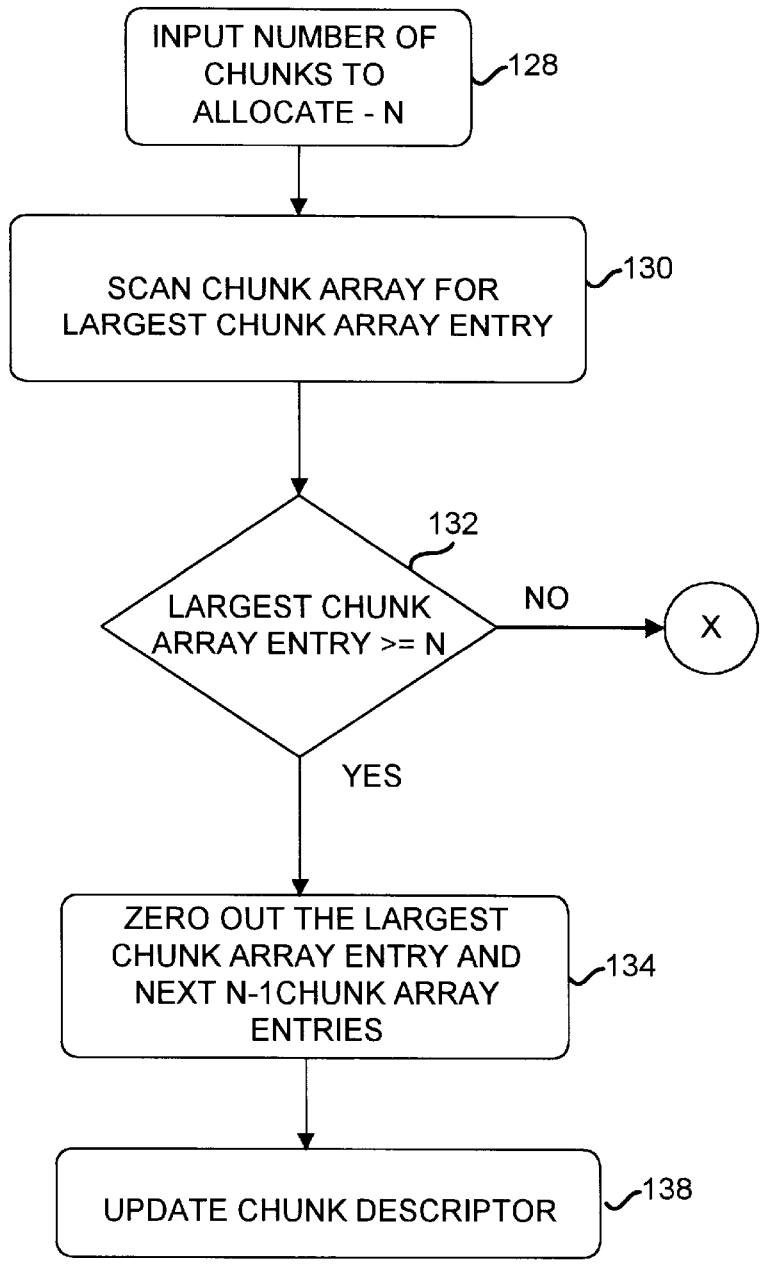
FIG. 7 shows the method of the invention to allocate chunks in a segment using a worst fit method.

Refer now to FIG. 6 which shows the method of the invention to allocate chunks in a chunked segment using the best/range fit method. The method first inputs the number of chunks to allocate, N, in step 114. Next a closeness of fit, FIT, is provided in step 116. The closeness of fit indicates how many chunks an entry may be greater than and be used for a data transfer request. For example, a FIT of zero indicates a perfect fit. A FIT of 2 would allow a request for 4 chunks to be satisfied by a chunk array entry of 4, 5, or 6 chunks.

A current chunk variable is set to the first chunk array entry in step 118. The process flows to step 122 to check if the current chunk array entry is greater than or equal to the number of chunks to allocate, N, and less than or equal to the number of chunks plus the fit, N+FIT. If the current chunk array entry is less than the number of chunks to allocate, or outside the fit, the process flows to step 120 to set the current chunk to the next entry in the chunk array. The routine then checks for the end of the chunk array at 119. If the end is reached then no chunk array entry fits the request and the routine exits at 121. If the end of the array has not been reached, the routine continues to scan the chunk array at 122. If the request fits in the current chunk array entry the process flows to step 124 to zero out the current chunk array entry and the next number of chunks minus 1, N−1, chunk array entries. At step 125, the process updates non-zero entries prior to the current entry to reflect the allocation. The process then flows to step 126 to update the chunk descriptor for the chunks allocated Refer now to FIG. 7 which shows the method of the invention to allocate chunks in a chunked segment using the worst fit method. The method first inputs the number of chunks to allocate, N, in step 128. The process flows to step 130 to find the largest chunk entry in the chunk array. If the request fits in the largest chunk array entry, the process flow to step 134 to zero out the current chunk array entry and the next number of chunks minus 1, N−1, chunk array entries. The process then flows to step 138 to update the chunk descriptor for the chunks allocated. If the largest chunk array entry does not fit the request, then the routine exits without finding an available chunk array entry.

A C/C++ routine that allocates chunks is shown in listing 3.

Listing 3—AllocateChunks C++Code (© 1996 Western Digital Corp.)

| Function Name: | BYTE AllocateChunks (BYTE numChunks) |
|---|---|
| Input: | number of chunks required |
| Returns: | chunk index of first allocated chunk or CH_EOL if numChunks won't fit |
| Description: | zeros out the chunks that have been allocated |

-continued

```
BYTE AllocateChunks (BYTE numChunks)
{
    BYTE i;
    for(i=0; i<CH_WC_CHUNKS;++i)
    {
        if(chunks[i]>=numChunks)
        {
            for(;numChunks;)
            {
                chunks[--numChunks+i] = 0;
            }
            return i;
        }
    }
    return CH_EOL;
}
```

AllocateChunks takes as an argument the number of chunks, 'numChunks.' AllocateChunks loops through the chunk array, 'chunks,' and finds the first chunk array entry that is greater than or equal to the number of chunks, 'numChunks.' If an entry is not found that is greater than or equal to the number of chunks the routine returns an end of list condition If an entry is found that is greater than or equal to 'numChunks' the routine enters a loop that executes 'numChunks' times. Through each pass 'numChunks' is decremented by one and the chunk array at the 'numChunks' plus i location is set to zero. The routine then returns the location of the lead chunk, i, after having allocated 'numChunks' number of chunks.

Figure 8:
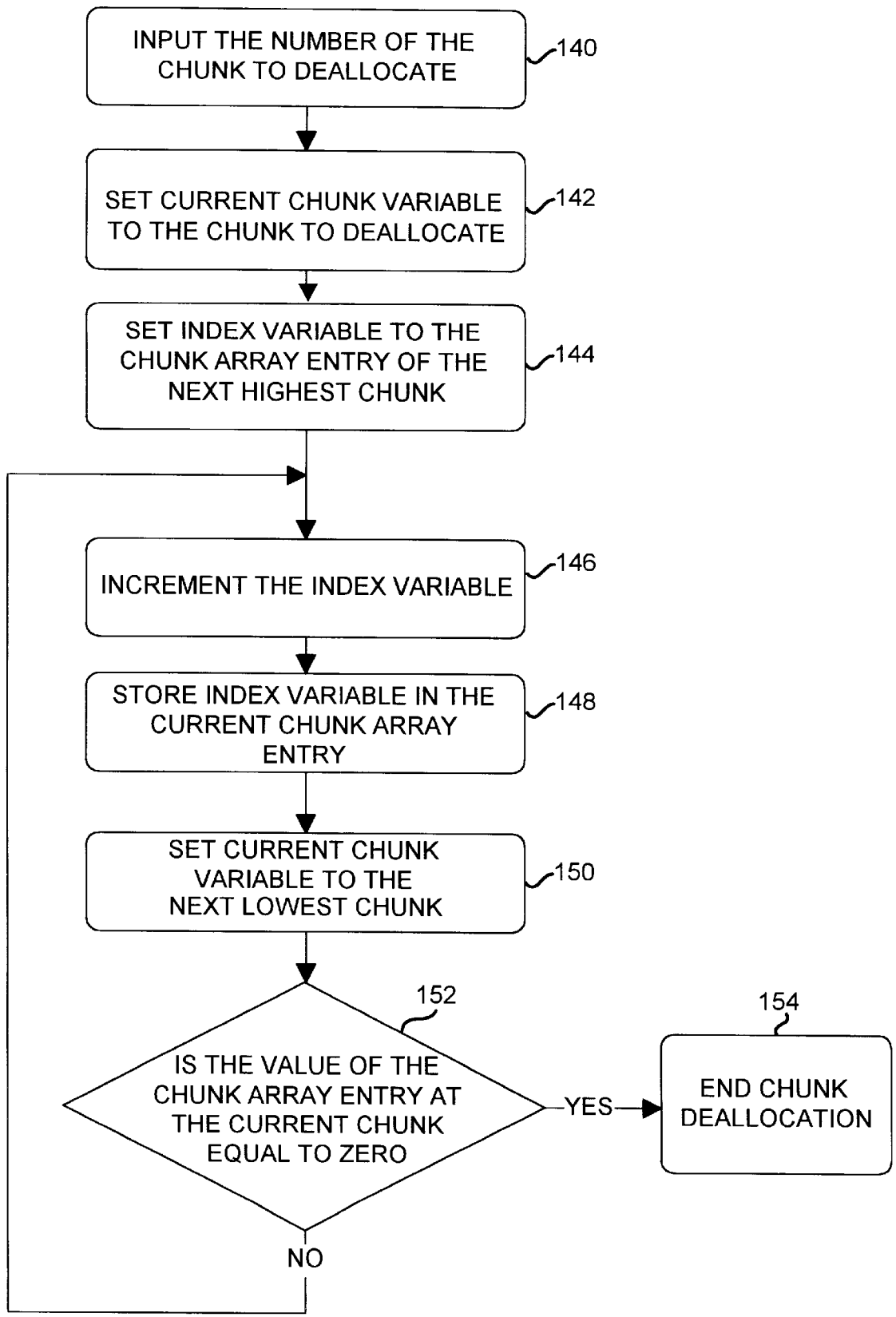
FIG. 8 shows the method of the invention to deallocate chunks in a segment of the cache.

Refer now to FIG. 8 which shows the method of the invention to deallocate chunks in a chunked segment. The number of the chunk to deallocate is input in step 140. A current chunk variable is set to the chunk to deallocate in step 142. In step 144 an index variable is set to the value of the chunk array entry for the next highest chunk. The index variable is incremented in step 146. The index variable is stored in the chunk array entry for the current chunk in step 148. The current chunk variable is set to the next lowest chunk from the current chunk in step 150. If in step 152, the value of the chunk array at the current chunk is zero, the process ends at step 154. Step 154 ends the procedure with the chunk successfully deallocated. If the value of the chunk array at the current chunk is not zero then the process flows back to step 146 to increment the index variable to repeat until a zero value is found. Thus each chunk array entry explicitly states the number of contiguous chunks available for allocation.

A C/C++ routine that deallocates multiple chunks using a similar method is shown in listing 4.

Listing 4—FreeChunks C++Code (© 1996 Western Digital Corp.)

```
Function Name:  void FreeChunks (BYTE chunkIdx, BYTE numChunks)
Input:          chunk index of first allocated chunk; number of chunks that were allocated
Returns:        none
Description:    renumbers the chunks that have been freed
void FreeChunks (BYTE chunkIdx, BYTE numChunks)
{
    BYTE i;
    BYTE num;
    num=chunks[chunkIdx + numChunks];
    for(i = chunkIdx + numChunks -1;i;--i)
    {
        if((i<chunkIdx) && (chunks[i] == 0))
        {
            break;
        }
        chunks[i]= ++num;
    }
    return;
}
```

FreeChunks takes as an argument the chunk index, 'chunkIdx,' to free and the number of chunks to free, 'numChunks.' The number of the chunk array, 'chunks,' at the chunk index plus the number of chunks is stored in a temporary variable, 'num.' The routine loops until an allocated chunk is found and 'numChunks' number of chunks have been freed. The chunk array, 'chunks,' is set to 'num' plus one at the ith location each time through the loop. The routine ends having freed all the memory up to an allocated chunk having rebuilt the chunking structure in the chunk array.

Now that the chunking allocation, and deallocation, methods of the invention have been described, an example of chunk allocation and chunk deallocation will be given.

Figure 9:
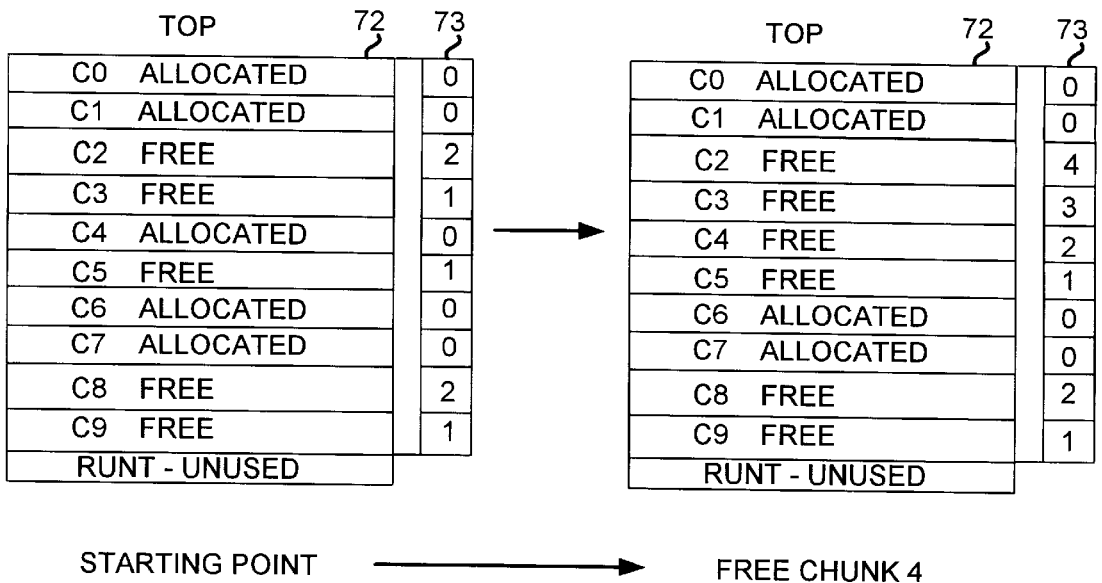
FIG. 9 shows an example of the method of the invention to free a chunk of the chunked segment.

Refer to FIG. 9 which shows an example of the method of the invention to deallocate a chunk in a chunked segment 72 using a chunk array 73 having entries corresponding to each chunk of chunked segment72. Chunked segment 72 has 10 chunks labeled C0, C1, C2, C3, C4, C5, C6, C7, C8 and C9. A "runt" entry is shown indicating a portion of a segment which is smaller than a chunk which might occur when the number of chunks in a segment is not an integer. The runt portion would not be allocated in the chunked segment. The first location of the chunk array 73, chunk array entry C0, is on the top. Chunk C4 is to be freed. The value in chunk array entry C5, a one, is incremented to two, indicating that both C4 and C5 are available, and stored in chunk array entry C4. Chunk array entry C3 is then checked. The value in chunk array entry C3 is non zero, a 1, and the next chunk array entry C4 is a 2 so a 3 is stored in chunk array entry C3 indicating that three consecutive chunks C3, C4, and C5 are available. In a similar manner chunk array entry C2 is checked, the value in chunk array entry C2 is non zero, a 2, so a 4 is stored in chunk array entry C2. Chunk array entry C1 is checked, the value in chunk array entry C1 is zero, meaning chunk array entry C1 is used and allocated to a request. Chunk array entry C4 has been successfully freed, and the method of the invention to deallocate chunks ends. It can easily be seen that the value now in chunk array entry C2, a four, immediately indicates that four contiguous chunks are available for allocation.

Figure 10:
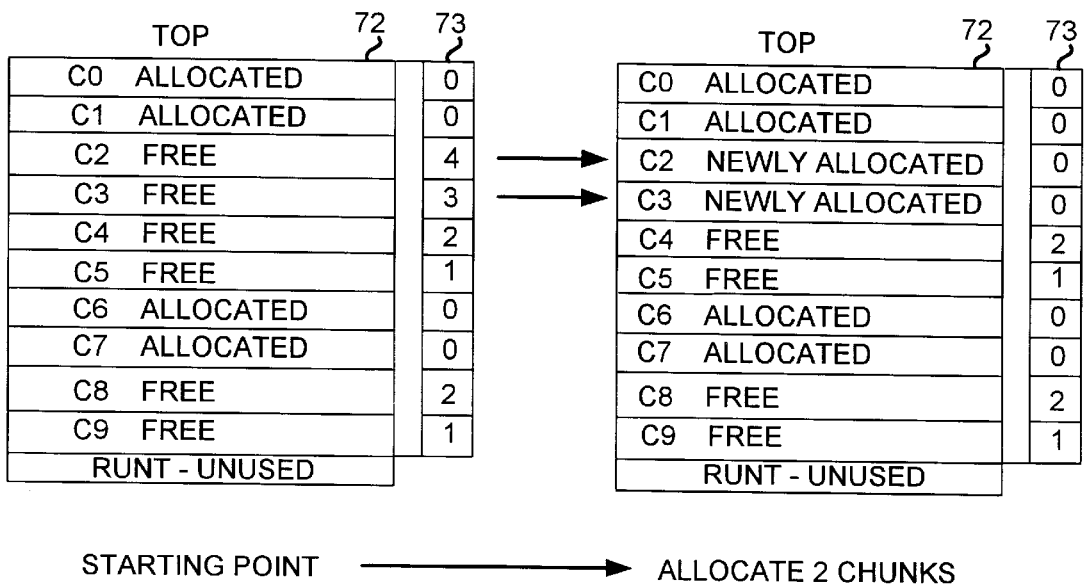
FIG. 10 shows an example of the method of the invention to allocate two chunks of the chunked segment.

Refer now to FIG. 10 which shows an example of the method of the invention to allocate two chunks of a chunked segment 72 to satisfy a data request As with FIG. 9, Chunked segment 72 has 10 chunks, labeled C0, C1, C2, C3, C4, C5, C6, C7, C8 and C9. The startng states of the chunk array 73 are shown with corresponding allocated or free data type entries. The allocation based on a first fit method scans the chunk array 73 to find the first chunk array entry that is greater than or equal to the number of chunks to be allocated. In this example the chunk array entry C2 is the first such entry to meet the first fit criteria The two chunks are newly allocated by zeroing the chunk array 73 at chunk array entry C2 and chunk array entry C3 and noting the starting LBA and block length in a chunk descriptor array. This process allocates the chunks in a segment to the data request.

What is claimed is:

1. A method of tracking the allocation of portions of a buffer memory in a disk drive having means for connecting to a host computer wherein the buffer memory is logically divided into a plurality of segments and the disk drive has a status means for declaring that a segment is either a chunked segment or an unchunked segment, the chunked segment being logically divided into N chunks where N is an integer, and the disk drive further having a chunk array that is associated with the chunked segment wherein the chunk array has N entries where each entry is associated with a respective one of the chunks of the chunked segment, the method comprising the steps of:
   a) defining an unavailable data type to be stored in an entry of the chunk array which indicates that a chunk is not available;
   b) defining an available data type to be stored in an entry of the chunk array which indicates that a chunk is available and that indicates the number of consecutive chunks which are available;
   c) receiving a data transfer request and allocating a portion of the chunked segment for the data;
   d) scanning the chunk array to find a consecutive sequence of chunks which will satisfy the data transfer request; and
   e) updating the chunk array to reflect whether the chunks are currently available or not available.

2. The method of claim 1 wherein the step of updating the chunk array to reflect whether the chunks are currently available or not available comprises the step of making a chunk available.

3. The method of claim 2 wherein the step of making a chunk available further comprises the steps of:
   a) setting a current chunk variable to the chunk to be made available;
   b) setting an index variable to the value in the chunk array entry for the next highest chunk after the current chunk;
   c) incrementing the index variable;
   d) storing the index variable in the chunk array entry for the current chunk;
   e) setting the current chunk variable to the next lowest chunk before the current chunk; and
   f) checking the value of the chunk array entry for the current chunk, and if the value is equal to the unavailable data type, terminating the update, and if the value is not equal to the unavailable data type, repeating steps c) through f) until an unavailable data type value is found in the chunk array.

4. The method of claim 1 wherein the step of updating the chunk array to reflect whether the chunks are currently available or not available comprises the step of making a chunk unavailable.

5. The method of claim 4 wherein the step of making a chunk unavailable further comprises setting the value of the chunk array entry for the chunk to the unavailable data type.

6. The method of claim 5 wherein the unavailable data type equals zero.

7. The method of claim 1 wherein a plurality of chunks contain data associated with a plurality of sequential logical block addresses.

8. The method of claim 1 wherein the consecutive sequence of chunks needed to satisfy a request equals a rounded integer determined by the number of logical blocks requested times the sum of the number of bytes in a logical block plus the number of bytes for error detection divided by the number of bytes in a chunk.

9. The method of claim 1 further comprising the step of maintaining a chunk descriptor for one or more chunks.

10. The method of claim 1 wherein a segment is allocated based on a size of the data to be transferred.

11. The method of claim 1 wherein the means for connecting to a host computer conforms to the Small Computer System Interface (SCSI) standard.

12. The method of claim 1 wherein the steps are implemented by a microcontroller.

13. The method of claim 1 further comprising the step of assigning a request to the chunked segment if the amount of data requested is less than a predetermined portion of the chunked segment.

14. The method of claim 13 wherein the predetermined portion is one half the chunked segment.

15. The method of claim 1 further comprising the step of assigning a request to the unchunked segment if there is a cache hit in the unchunked segment.

16. The method of claim 1 wherein the unchunked segment stores data from a sequential stream as indicated by two consecutive logical block groups being referenced in two commands.

* * * * *